T. H. WHYMAN.
NUT LOCK.
APPLICATION FILED OCT. 17, 1914.
1,200,285.
Patented Oct. 3, 1916.
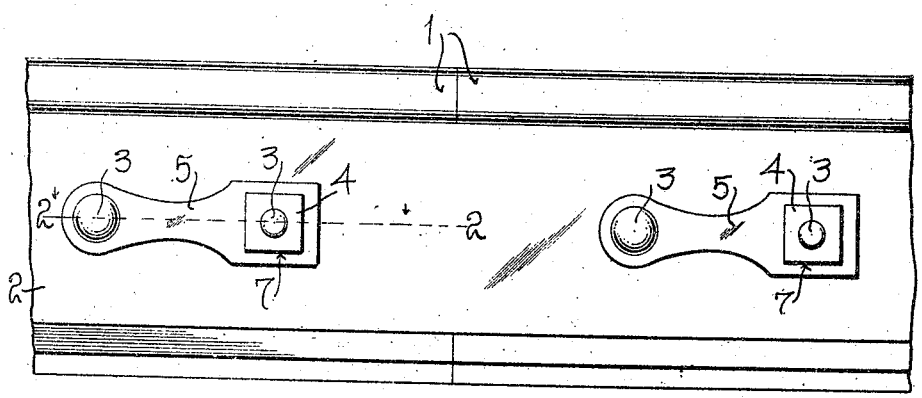
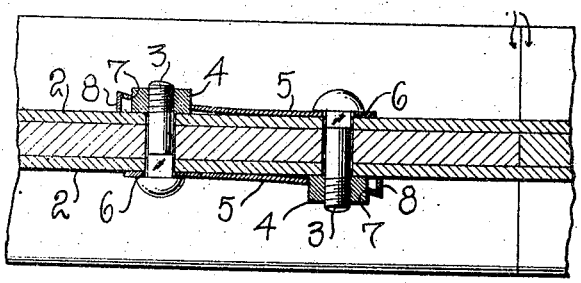
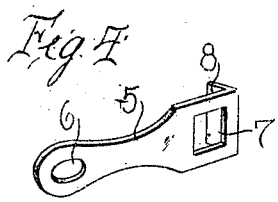 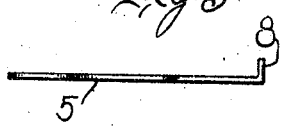
Inventor
THEODORE H. WHYMAN
By Watson E. Coleman
Attorney

UNITED STATES PATENT OFFICE.

THEODORE H. WHYMAN, OF BRULE, NEBRASKA.

NUT-LOCK.

1,200,285.

Specification of Letters Patent.     Patented Oct. 3, 1916.

Application filed October 17, 1914.   Serial No. 867,152.

*To all whom it may concern:*

Be it known that I, THEODORE H. WHYMAN, a citizen of the United States, residing at Brule, in the county of Keith and State of Nebraska, have invented certain new and useful Improvements in Nut-Locks, of which the following is a specification, reference being had to the accompanying drawings.

This invention relates to new and useful improvements in nut locks and particularly to a nut lock for use in connection with the bolts and nuts used for securing fish plates to the meeting ends of rails.

An object of this invention is the provision of a nut lock which may be supported on one bolt adjacent its head, for locking engagement with the nut mounted on an adjacent bolt.

A further object of this invention is the provision of a nut lock which may be quickly and easily applied to nuts and bolts used for connecting fish plates to the meeting ends of rails when the fish plates are connected to the rails.

Still another object of this invention is the provision of a nut lock which consists of one piece of material, whereby the same may be cheaply manufactured, the nut lock at the same time being extremely efficient and durable in use.

With these and other objects in view, my invention consists in the novel construction, combination, and arrangement of parts, to be hereinafter more fully described, claimed, and illustrated in the accompanying drawing, in which—

Figure 1 is a side elevational view of a rail joint showing my improved locking plates in operative position; Fig. 2 is an enlarged sectional view taken substantially on the line 2—2 of Fig. 1; Fig. 3 is an edge view of the locking plate as herein embodied; and Fig. 4 is a view in perspective of the locking plate as herein set forth.

As disclosed in the accompanying drawings, 1 denotes the meeting ends of rails with which coact the fish plates 2, said meeting ends of rails and plates being provided with the registering openings through which the bolts 3 are adapted to be directed. It is to be particularly noted that said bolts are arranged in pairs and the bolts of each pair are reversely directed and have coacting therewith in a conventional manner the nuts 4.

To lock the nuts 4 of each pair of bolts, elongated locking plates 5 are provided, the plates being preferably formed of spring steel, and the width of the plates being reduced intermediate of their ends to allow the plates to be easily flexed. Formed in one end of each plate is an elongated opening 6 through which the shank of one of the bolts is adapted to extend and formed in the other end of each plate is an angular opening 7 which is of substantially the same conformation as the nuts 4, so that when the nuts are engaged within the openings 7 in the plates, rotation of the nuts relative to the plates is prevented.

My improved locking plates 7 are of such construction, that the same may be engaged with the nuts and bolts 3 and 4 respectively when the rails and fish plates are assembled, and in assembling the various parts of the rail joint, the meeting ends of the rails are engaged against each other and the fish plates are engaged against the opposite sides of the webs of the rails with the openings in the fish plates registering with the openings in the rails. A bolt 3 is inserted through one of the openings in each of the rails and the registering openings in the fish plates, the bolts being first inserted through the openings 6 in locking plates 5, and nuts 4 are then turned upon the bolts, the bolts supporting the plates 5 on one side of the rails. Other plates 7 are then arranged with the nuts 4 engaging in the openings 7 in the plates, and the openings 6 in the plates registering with the other opening of each pair in the rails, so that when bolts 3 are passed through the remaining opening of each pair in the rails, from the opposite side of the rails to which the first mentioned bolts were passed, the last mentioned plates are secured in position upon the rails to lock the nuts 4 on the first mentioned bolts. The free ends of the first mentioned plates 5 are then sprung outwardly so that nuts 4 may be then threaded on the free ends of the last mentioned bolts, whereupon the free ends of the plates may be released so that the nuts will extend through the openings 7 therein so that all of the nuts are locked on their respective bolts.

The end portions of each of the plates 5 adjacent the opening 7 is provided with the flange 8 extending inwardly at right angles to the body portion of the plate, the free edge of the flange being adapted to engage the adjacent fish plate whereby the locking plate 7 engages the coacting nut 4 at a point intermediate the front and rear faces of the nut and maintaining the adjacent end portion of the plate 5 away from the adjacent fish plate 2. By this construction it will be perceived that the plate can be formed of thin metal whereby the cost of production is materially reduced. It will also be perceived that by having the end portion of the plate 5 maintained away from the fish plate 2, a tool may be easily inserted between the fish plate and the locking plate when it is desired to disengage the locking plate away from its nut.

From the above description taken in connection with the accompanying drawing, it will be seen that I have provided locking plates which when engaged with nuts in the aforementioned manner will securely lock the nuts on their bolts to prevent the nuts from turning, and it will be seen from the drawing that the elongated or oval-shaped openings 6 in the plates are of sufficient diameter to engage the shoulders of the bolts to prevent the bolts from turning, whereby a rigid joint is provided for the meeting ends of the rails.

Having thus fully described my invention, what I desire to claim and secure by Letters Patent is:—

In combination with a body, headed bolts disposed therethrough in opposite directions, and nuts engaged with the bolts; a spring plate having its intermediate portion reduced to increase its flexibility, one end portion of the plate being provided with an opening through which one of the bolts is disposed, the opposite end of the plate being provided with an angular opening to snugly receive the nut coacting with the second bolt, said last end portion of the plate being provided with an inturned flange engaging the body and maintaining the adjacent end portion of the plate away from the body and at a point intermediate the front and rear faces of the nut.

In testimony whereof I hereunto affix my signature in the presence of two witnesses.

THEODORE H. WHYMAN.

Witnesses:
A. G. BERRYMAN,
O. P. KILGORE.